United States Patent
Hojjatie et al.

(10) Patent No.: US 6,921,523 B2
(45) Date of Patent: Jul. 26, 2005

(54) MAGNESIUM THIOSULFATE SOLUTION AND PROCESS FOR PREPARING SAME

(75) Inventors: Michael Massoud Hojjatie, Tucson, AZ (US); Constance Lynn Frank Lockhart, Tucson, AZ (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 0 days.

(21) Appl. No.: 10/682,863

(22) Filed: Oct. 14, 2003

(65) Prior Publication Data

US 2005/0079125 A1 Apr. 14, 2005

(51) Int. Cl.[7] .......................... C01F 5/40; A01N 59/02; A01N 59/06
(52) U.S. Cl. ...................... 423/514; 504/188
(58) Field of Search ................ 423/514, 515; 504/188

(56) References Cited

U.S. PATENT DOCUMENTS

| | | | |
|---|---|---|---|
| 1,803,157 A | * 4/1931 | Wesenberg et al. | 504/188 |
| 3,617,212 A | * 11/1971 | Shah | 423/522 |
| 3,709,660 A | * 1/1973 | Urban | 423/566 |
| 3,773,662 A | * 11/1973 | Urban | 210/719 |
| 3,865,794 A | 2/1975 | Scoggins et al. | |
| 4,105,754 A | * 8/1978 | Swaine, Jr. et al. | 423/514 |
| 4,300,941 A | 11/1981 | Nakama | |
| 4,499,078 A | * 2/1985 | Revici | 424/680 |
| 4,695,583 A | 9/1987 | Revici | |
| 4,756,909 A | 7/1988 | Revici | |
| 5,096,721 A | 3/1992 | Levy | |
| 5,192,571 A | 3/1993 | Levy | |
| 5,431,776 A | 7/1995 | Richardson et al. | |
| 5,514,644 A | 5/1996 | Dobson | |
| 5,562,941 A | 10/1996 | Levy | |

FOREIGN PATENT DOCUMENTS

| | | |
|---|---|---|
| CA | 1282339 | 4/1991 |
| DE | 2364170 | 7/1974 |
| EP | 0491103 A1 | 6/1992 |
| EP | 0491103 B1 | 3/1996 |
| GB | 816592 * | 7/1959 |
| GB | 2194885 A | 3/1988 |
| JP | 48-6039 | 2/1973 |
| JP | 59-80738 * | 5/1984 |
| JP | 7-306039 | 11/1995 |

OTHER PUBLICATIONS

Derwent Abstract Accession No. 1996–043847, for JP 07306039 (JP 7–306039), published Nov. 21, 1995.*
English translation of JP 48–6039, corresponding to application No. JP 43–18576, published Feb. 22, 1973.*
English translation of JP 59–80738, published May 10, 1984.*
Piezoelectric Crystal Detection of Hydrogen Chloride via Sulfur Dioxide/Mercury Displacement; Hahn, E.C., et al; Analytical Letters; vol. 22; pp. 213–224; 1989.
Hanbuch der Anorganischen Chemie, vol. 11, 1984, pp. 284–285.

* cited by examiner

Primary Examiner—Stanley S. Silverman
Assistant Examiner—Ardith E Hertzog
(74) Attorney, Agent, or Firm—Banner & Witcoff, Ltd.

(57) ABSTRACT

An efficient process for the preparation of magnesium thiosulfate involves reaction of magnesium hydrosulfite and sulfur at elevated temperature. Magnesium hydrosulfite can be prepared from commercial magnesium oxide and sulfur. Sulfur dioxide can be used to maintain pH. The resulting product is an emulsion of liquid magnesium thiosulfate and solid byproducts. Under controlled conditions, including mole ratios of MgO to sulfur, temperature of the reaction process, and pH, as well as rate and duration of $SO_2$ purging, production of byproducts can be reduced to less than about 2% by weight. The magnesium thiosulfate solution can be prepared with concentrations of at least about 25%, preferably at least about 30%.

18 Claims, 5 Drawing Sheets

MAGNESIUM THIOSULFATE SOLUTION AND PROCESS FOR PREPARING SAME

FIELD OF THE INVENTION

The present invention is directed to plant nutrient solutions, and more particularly, to plant nutrient solution containing magnesium thiosulfate (MgTS).

DESCRIPTION OF RELATED ART

The thiosulfate ion, $S_2O_3^{2-}$, is a structural analogue of the $SO_4^{2-}$ ion in which one oxygen atom is replaced by one S atom. However, the two sulfur atoms in $S_2O_3^{2-}$ are not equivalent: One of the S atoms is a sulfide-like sulfur atom that gives the thiosulfate its reducing properties and complexing abilities.

Thiosulfates are used in leather tanning, paper and textile manufacturing, flue-gas desulfurization, cement additives, dechlorination, ozone and hydrogen peroxide quenching, coating stabilizers and so on. Due to the complex-forming abilities with metals, thiosulfate compounds have been used in commercial applications such as photography, waste treatment and water treatment applications.

Thiosulfates readily oxidize to dithionate, then tetrathionate and finally to sulfates:

$$S_2O_3^{2-} + O_2 \Leftrightarrow S_2O_6^{2-} \rightarrow SO_4^{2-}$$

Due to this transformation, thiosulfates are used as fertilizers in combinations with cations such as ammonium, potassium, magnesium and calcium. The ammonium, alkali metal and alkaline earth thiosulfates are soluble in water. Water solubilities of thiosulfates decrease from ammonium to alkali metals to alkaline earth thiosulfates.

Magnesium is an important element in the nutrition of animals and plants. It is a part of every animal cells. Its primary source is in foods of plant origin. It is also a part of every plant cell. Magnesium is a component of chlorophyll, the plant pigment that gives plants their green color and traps sunlight for subsequent conversion to the chemical energy used in plant growth.

Magnesium deficiency symptoms vary among crop species. Dicots (e.g., tobacco, soybeans) exhibit interveinal yellowing of the leaf. In monocots (e.g., grasses, small grains, corn) pale yellow regions develop at the base of leaves and yellow strips run towards the leaf tip as deficiency intensifies. On all crops the older leaves are first to show signs of Mg stress. Magnesium deficiency often occurs in calcareous soils in the potato growing areas. Studies have indicated substantial benefits to potato production when 20 pounds of magnesium was broadcast applied to the soil at planting.

Occasionally, magnesium deficiency occurs in apple orchards planted on calcareous soils as well. Growers often apply foliar Mg when tissue analysis indicates low levels or when tree growth is poor due to low soil levels. Nursery growers have reported magnesium deficiencies in fir trees. Soil samples from grass seed fields in recent years have indicated that levels of magnesium have been dropping. At planting, growers typically use dolomite to increase the soil pH and Mg levels. Older fields, however, are running short and supplemental applications are necessary.

The most common carriers of Mg are dolomite, Epsom salt, and magnesia. Dolomite ($MgCO_3+CaCO_3$) and magnesia (MgO) are very insoluble in water. Magnesium thiosulfate is a liquid source of Mg with up to 32% in concentration. Magnesium thiosulfate has been used in industrial and waste treatment applications, in food manufacturing applications, pharmaceutical applications, and in agricultural applications.

Industrial and waste treatment applications include the reduction of mercurous ion to free mercury, during which $MgS_2O_3$ is first reacted with hydrogen chloride to generate $SO_2$. See Piezoelectric Crystal Detection of Hydrogen Chloride via Sulfur Dioxide/Mercury Displacement; Hahn, E. C., et al; Analytical Letters; Vol. 22; p 213–224; 1989. Another example of an industrial application is catalysis for polyolefin manufacture. See German Patent 2364170 to Galliverti et al. (1974), Catalysts for Polyolefin Manufacture. Other examples of industrial applications include stabilization of the copper (I) state in copper etchant solutions additives, as described in U.S. Pat. No. 5,431,776 to Richardson et al., Copper Etchant Solution Additives, and use of magnesium thiosulfate as a raw material for the synthesis of arylene sulfide polymers, as disclosed in U.S. Pat. No. 3,865,794 to Scoggins et al., Arylene Sulfide Polymers.

Food manufacturing applications include use of magnesium thiosulfate as a substitute for sodium chloride salt. See U.S. Pat. No. 4,499,078 to Revici, Counteracting the Deleterious Effects of Sodium Chloride. Magnesium thiosulfate also has been used for reduction of bitterness (e.g., due to chlorines, chloramines, alkaloids and phenols) in beverages. See U.S. Pat. No. 5,562,941 to Levy, Process for Improving the Taste of Beverages by Reducing Bitterness; and U.S. Pat. No. 5,096,721 to Levy, Process for Making an Aqueous Beverage and Removing Chlorine Therefrom. Other food manufacturing applications include dechlorination of tap water for use in beverage manufacture. See U.S. Pat. No. 5,192,571 to Levy, Processes for Effecting the Dechlorination of Tap Water Added to Beverages. Magnesium thiosulfate also is used as an additive for increasing the thermal stability of aqueous polysaccharide-containing fluids, as disclosed in U.S. Pat. No. 5,514,644 to Dobson, Polysaccharide Containing Fluids Having Enhanced Thermal Stability.

Pharmaceutical applications of magnesium thiosulfate include its use in conjunction with sodium chloride as a neoplasm inhibitor/antagonist, as well as its use with vanadium in treating arteriosclerosis. See Canadian Patent 1,282,339 to Revici, Sodium Chloride Antagonist Compositions, Especially for Use in Tumor Inhibition; and UK Patent 2,194,885 to Kaplan, Pharmaceutical Compositions Containing Vanadium and a Thiosulfate. Other pharmaceutical applications include its use in conjunction with organogermanium derivatives to treat viral diseases and immune system deficiencies, as described in EP 00491103 to Larranaga et al. (1996), Compositions for Therapeutic Use Comprising Organogermanium Derivatives. Magnesium thiosulfate also has been used as an analgesic, as disclosed in U.S. Pat. No. 4,756,909 to Revici, Method for Relieving Pain or Producing Analgesic with N-butanol; and U.S. Pat. No. 4,695,583 to Revici, Method for Relieving Pain or Producing Analgesic.

Agricultural applications of magnesium thiosulfate include its use in the acceleration of crop maturation, as described in U.S. Pat. No. 4,300,941 to Nakama, Agent and Method for Accelerating the Maturation of Field and Garden Crops.

Surprisingly, a viable commercial approach to the production of magnesium thiosulfate is not described in the literature. It is contemplated that magnesium thiosulfate can be produced using several alternative routes such as:

1. Reaction of the magnesium sulfite with sulfur:

$$MgSO_3 + S \longrightarrow MgS_2O_3$$

Equation above assumes the reaction is occurring at a pH where the predominant species, relative to the $SO_3^{2-}/HSO_3^-$ equilibrium, is $SO_3^{2-}$.

II. If $HSO_3^-$ is the predominate species, the reaction is:

$$Mg(HSO_3)_2 + 2\,S + MgO \longrightarrow 2\,MgS_2O_3 + H_2O$$

Magnesium sulfite is the product of the reaction:

$$MgO + SO_2 \longrightarrow MgSO_3$$

Magnesium bisulfite is the product of the reaction $$MgO + 2\,SO_2 + H_2O \longrightarrow Mg(HSO_3)_2$$

III. Reaction of magnesium polysulfide with $SO_2$:

$$2\,MgO + (x+2)S + \tfrac{1}{2}\,O_2 \longrightarrow MgS_x + (MgS_2O_3)$$

$$MgS_x + (MgS_2O_3) + SO_2 + \tfrac{1}{2}\,O_2 \longrightarrow MgS_2O_3 + (x-1)S + (MgS_2O_3)$$

IV. Oxidation of magnesium hydrosulfide:

$$Mg(SH)_2 + 2\,O_2 \longrightarrow MgS_2O_3 + H_2O$$

V. Reaction of a sulfide or hydrogen sulfide with magnesium sulfite or bisulfite, such as:

$$2\,H_2S + 2\,Mg(HSO_3)_2 + MgO \longrightarrow MgS_2O_3 + 4\,H_2O$$

VI. Salt exchange of $Mg^{2+}$ for another divalent cation of magnesium, such as:

$$MgSO_4 + BaS_2O_3 \longrightarrow MgS_2O_3 + BaSO_4$$

Of these reaction schemes, (IV) is not practical. Laboratory trials investigating the synthesis of $Mg(SH)_2$ proved it to be an extremely unstable compound. $MgSO_3$ is only significantly soluble at high temperatures (1.25% at cold temperatures). In addition, magnesium polysulfide does not exist at ambient temperature and pressure. Reactions (V) and (VI) also are not appealing, due to either the requirement for multi-step processing (reaction V) or the large amount of solid waste generated (reaction VI).

Magnesium thiosulfate is not commonly referred to in literature. The few articles that prevail, discuss technically specific physical properties of the end product itself. Synthetic methods are described in JP 73-06039 (JP 48-6039, published Feb. 22, 1973) and corresponding to application number JP 43-18576). Also, there is mention of MgTS in a short German description in Hanbuch der Anorganischen Chemie, vol. 11, 1984. Both JP 73-06039 and the German citation refer to adding sulfur to magnesium sulfite to produce magnesium thiosulfate. Neither reference describes the pH nor physical consistency of the "sulfite" intermediate, although the German article does note the "color change" observed as $SO_2$ is purged into MgO: the slurry becomes yellow.

JP 73-06039 describes a process designed to remove $SO_2$ from waste gas streams and oil. The $SO_2$ is absorbed into magnesium hydroxide. The sulfite generated is then mixed with water, sulfur and additional magnesium hydroxide (to raise pH). The thiosulfate reaction is conducted over a 5 to 10 hour period at 102° C., producing a 1000 g/l solution of $MgS_2O_3 \cdot 6H_2O$. Crystals of thiosulfate are recovered from the cooled solution.

This JP publication also describes the formation of "thiosulfuric acid magnesium, $MgS_2O_3 \cdot 6H_2O$" by the reaction of sodium thiosulfate with Magnesium chloride and also from Magnesium Sulfite with sulfur and excess $Mg(OH)_2$. Magnesium sulfite is first produced from magnesium hydroxide, water and sulfur dioxide. The solubility of $Mg(OH)$ is 0.004% in water at 100° C. There is no mention of sulfite consistency or concentration of the product.

There remains a need for alternative processes for preparing magnesium thiosulfate solutions. It would be desirable to develop an efficient and cost-effective process for preparing magnesium thiosulfate solutions, especially one which can produce high concentration magnesium thiosulfate product solutions and which can utilize relatively inexpensive starting materials.

SUMMARY OF THE INVENTION

One aspect of the present invention is directed to a process for preparing magnesium thiosulfate using MgO, sulfur, and sulfur dioxide as starting materials. The process comprises providing a magnesium hydroxide slurry or a hydrated magnesium hydroxide. Sulfur dioxide is purged into the magnesium hydroxide slurry and reacted with magnesium hydroxide to form a reaction mixture. The reaction mixture is heated. Sulfur is added to the mixture and reacted under conditions sufficient to form magnesium thiosulfate, and the magnesium thiosulfate is recovered.

Liquid solutions containing high concentration of magnesium thiosulfate can be prepared having only minimal quantities of solid byproduct. The solid byproducts optionally can be recycled in the batch for further use. The byproduct waste consists of insulable impurities in the commercial raw material MgO. The conditions for reaction of magnesium hydroxide with sulfur dioxide and sulfur, e.g., pH, time and temperature, preferably are selected to minimize the amount of byproducts and increase the yield of magnesium thiosulfate.

In accordance with another aspect of the invention, a magnesium thiosulfate solution comprises an aqueous medium containing at least about 25 wt % $MgS_2O_3$, up to about 15 wt % sulfur, and up to about 6 wt % $Mg^{2+}$. The solid byproducts present in the solution preferably are, less than about 2% by weight.

BRIEF DESCRIPTION OF THE DRAWINGS

The present invention will now be described in more detail reference to preferred embodiments of the invention, given only by way of example, and illustrated in the accompanying drawing in which.

DETAILED DESCRIPTION OF THE INVENTION

The process of the present invention is described herein as proceeding according the following reaction pathway:

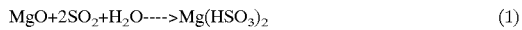

$$MgO + 2SO_2 + H_2O \longrightarrow Mg(HSO_3)_2 \quad (1)$$

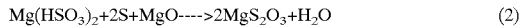

$$Mg(HSO_3)_2 + 2S + MgO \longrightarrow 2MgS_2O_3 + H_2O \quad (2)$$

Reaction (1) involves synthesis of a $Mg(HSO_3)_2$ intermediate. The intermediate is a slurry, which typically includes a mixture of $Mg(HSO_3)_2/MgSO_3$ and $Mg(OH)_2/MgO$, in both solution and solid state. For convenience, the intermediate is referred to herein as $Mg(HSO_3)_2$ because this is the predominant species that has been measured in solution. Reaction (2) involves the utilization of this intermediate for preparation of magnesium thiosulfate. As shown above, the stoichiometric reaction generates one mole of water for every two moles of magnesium thiosulfate generated.

Unless otherwise clear from the context, all percentages set forth herein refer to percentages by weight.

Figure 5:
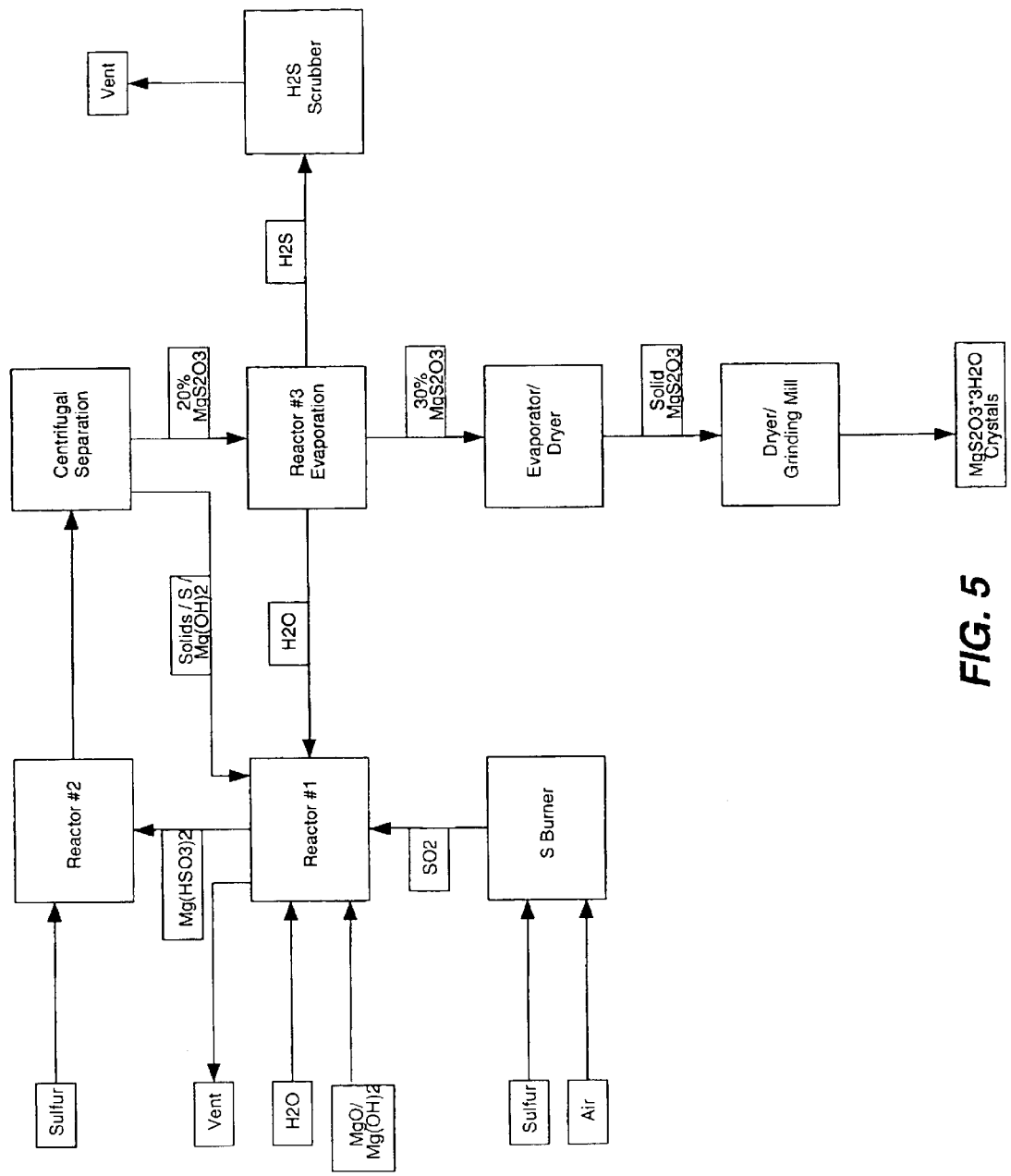
FIG. 5 is a process flow diagram, including a schematic illustration of a process according to one embodiment of the present invention.

With reference to FIG. 5, the first step of the synthesis, Reaction (1), involves the synthesis of magnesium hydrosulfite. MgO and water are charged into reactor 1. The entire quantity of MgO for both Reactions (1) and (2) usually is introduced into the first reactor 1. Effective agitation should be applied throughout the reactions. $SO_2$ preferably is purged into the MgO slurry to adjust the pH, usually to about 2.5 to 6.5 and preferably to about 6.2–6.4. Because the purging process generates heat, external energy application generally is not necessary.

For purposes of the calculation of the quantities of other raw materials, the mole ratio of $SO_2$ is taken as 1. In addition, raw materials amounts are adjusted relative to their purity. New raw materials (e.g., MgO and S) are also reduced, accordingly, relative to the amount of recycled residual solids produced in the process. Based on the excess raw materials used (e.g., 16% molar excess of MgO, and 18% molar excess S), the excess solid for a 1000 g reaction would theoretically be 9.5 g of MgO, 8.5 g S and 5.2 g of impurities using 93% MgO if all impurities are insoluble (or 3.2 g. solid). (2.3% recovered solids, on the average, measured only 1–2% of initial new raw materials. In the recycle of residual solids, their content is approximated as 53% MgO and 47% S. Based on the weight of solids recovered, this quantity, with adjustment for raw material purity, is deducted from the new raw materials added.)

The solubility of magnesium hydrosulfite is dependent on such factors as the initial magnesium oxide concentration, product pH and temperature. The solubility of $Mg(HSO_3)_2$ increases as pH decrease. At pH 2.5, the concentration of magnesium hydrosulfite as a clear and solid free liquid is 35% and has the physical appearance of a solution, while at pH 5 it is an absolute slurry. At high pH the composition of the slurry potentially consist of $Mg(OH)_2$, $MgSO_3$, and $Mg(HSO_3)_2$. Its solubility also increases as temperature decreases (solubility of $SO_2$ increases).

Reaction (2), involving the conversion of $Mg(HSO_3)_2$ to $MgS_2O_3$ occurs in reactor 2, which is charged with the $Mg(HSO_3)_2$ slurry synthesized in reactor 1. Reactor 2 is then charged with the prescribed quantity of S. Sufficient external heating is applied to bring the reaction solution to temperatures about 97–100° C. (207–212° F.). Heat application preferably is restricted to the minimum required to achieve the prescribed temperature range. When the applied heat is too intense, the reaction temperature will not changed significantly. However, an increase in the intensity of applied heat will increase solution evaporation. Evaporation can be deleterious to the reaction, particularly until the poorly soluble $Mg(HSO_3)_2$ has been converted to $MgS_2O_3$.

Once within the temperature range of 97–100° C. (207–212° F.), the reaction is continued, with agitation, until the conversion to $MgS_2O_3$ is complete. Reaction kinetics were demonstrated to be raw material dependent.

The conversion of $Mg(HSO_3)_2$ to $MgS_2O_3$ also occurs in the slurry state. The consistency of the slurry thins as the reaction proceeds. The pH preferably is maintained, during Reaction (2), between 6.2 and 6.5. The pH can be elevated by the addition of MgO. The quantity of magnesium oxide added usually varies from 0 to a magnesium oxide-to-sulfur dioxide ratio of from about 0.5:1 to 0.6:1. There is generally a delayed effect when using MgO to elevate pH, as it slowly enters solution. It was found that pH was lowered most effectively using $SO_2$. The effect of adjusting pH with $SO_2$, on the other hand, is essentially immediate. It is also possible to decrease pH by adding a low pH $Mg(HSO_3)_2$ intermediate solution. The water in the adjustment solution will dilute the $MgS_2O_3$ product further. When pH reduction is performed with $Mg(HSO_3)_2$ solutions, a small increase in the objective product concentration should be made. The pH of the product filtrate will be higher (e.g., by 1–2 pH) than that of the final product slurry, when the pH of the slurry is greater than 6. The pH levels measured in the filtrate generally will be consistent with those of the slurry when the pH of the final slurry is less than 6.

Figure 1:
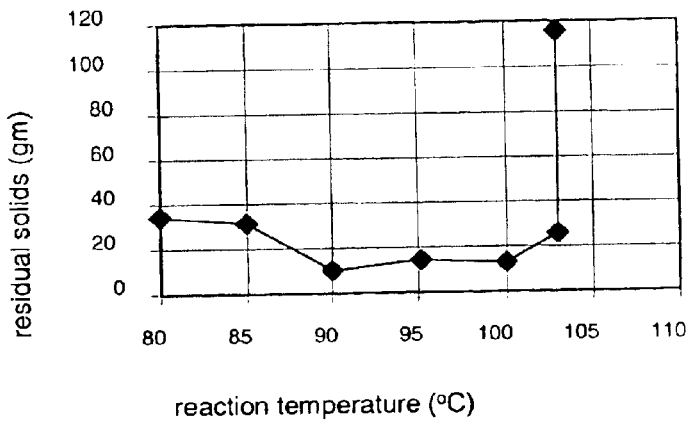
FIG. 1 is a graphical illustration of the reaction temperature vs. the amount of residual solid.

The concentration of magnesium thiosulfate directly depends on the concentration of magnesium hydrosulfite. Optimized and solid free product forms within the 20–25% concentration range. Higher concentrations can be achieved by evaporation. Temperature of the reaction is also an important factor. It was found that the highest concentrations resulted when using temperatures between about 90 and 100° C., especially between about 97 and 100° C. More solid residuals are formed at higher temperatures, as illustrated in FIG. 1.

Another influential factor on magnesium thiosulfate concentration is the relative mole ratio of raw materials. When stoichiometric amounts of raw materials were used, it was found that elevated levels of unreacted hydrosulfite with low pH formed.

Figure 2:
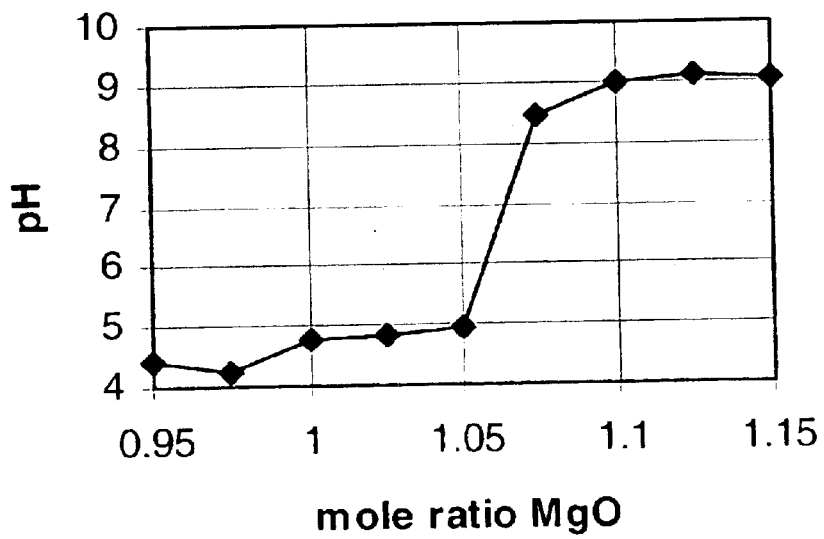
FIG. 2 is a graphical illustration of the mole ratio of MgO vs. pH.
Figure 3:
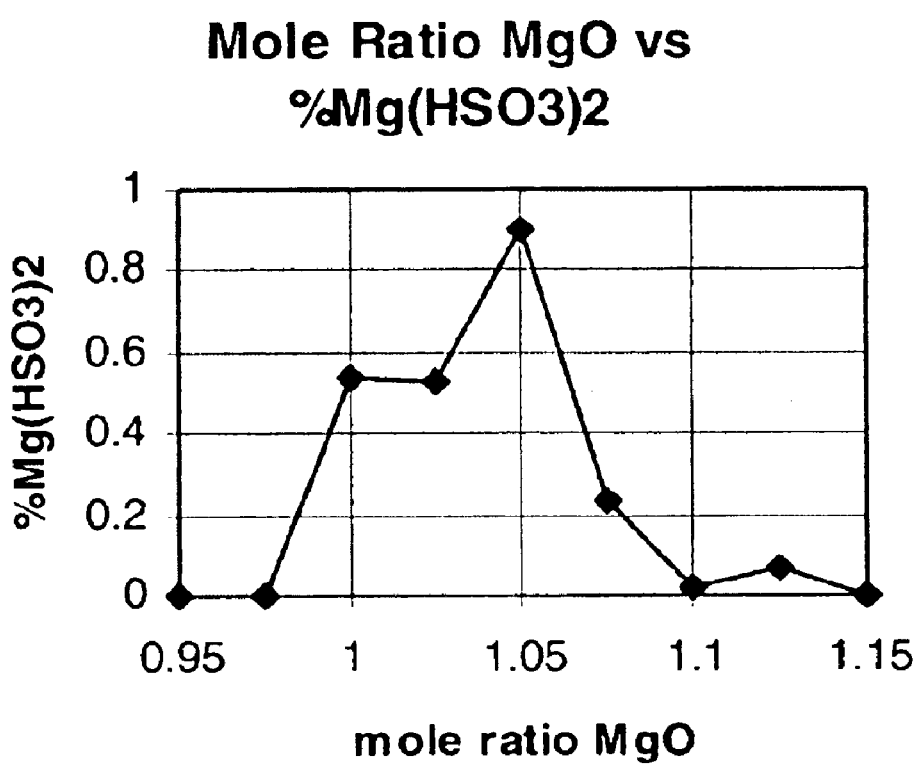
FIG. 3 is a graphical illustration of mole ratio of MgO vs. percent magnesium hydrosulfite.

A series of reactions were conducted where the mole ratio of MgO was varied, from 0.95 to 1.15, in 0.025 molar increments. The molar quantities of $SO_2$ and S were held constant at 1.00 and 1.20, respectively. Conforming to the mole ratios desired, raw materials were used consistent with producing 400 g of 20% $MgS_2O_3$. A stock solution of 35–36% $Mg(HSO_3)_2$ was synthesized per the reaction $MgO + 2SO_2 + H_2O \longrightarrow Mg(HSO_3)_2$. The stoichiometric amount of MgO was used for $Mg(HSO_3)_2$ synthesis. $SO_2$ was purged to pH=2.5. The concentrated solution of $Mg(HSO_3)_2$ was added to the appropriate amount of water consistent with a 1.00 molar ratio of $Mg(HSO_3)_2$ for a 20% product of $MgS_2O_3$. The 1.20 molar ratio of S, as well as the additional amount of MgO required to attain the defined mole ratio, were added to the diluted $Mg(HSO_3)_2$ solution. Each $MgS_2O_3$ conversion reaction was conducted over a four hour period, once the reacting solution reached 100° C. Evaporation was not strictly controlled, so some assay levels were higher than the predicted 20%. Final products were filtered hot, with vacuum, immediately at the conclusion of each reaction. Each filtrate was assayed once it cooled. Graphical representation for molar ratio MgO versus pH and $Mg(HSO_3)_2$ are illustrated in FIGS. 2 and 3, respectively.

The total MgO to $SO_2$ mole ratio often ranges from about 0.5:1 to 1.2:1 and preferably is from about 1:1 to 1.2:1. The sulfur-to-sulfur dioxide ratio most often ranges from about 1:1 to 1.2:1. The appropriate mole ratios for magnesium thiosulfate production using low pH intermediate is in the range of $MgO:SO_2:S=1.05–1.10:1.0:1.20$. Further studies showed that in order to control pH in $MgS_2O_3$ synthesis, methods other than mole ratio definition would have to be employed. The objective became a matter of defining ranges of raw materials quantities, which allowed the synthesis of a consistent, fully reacted product of high assay.

From mole ratio studies, where the mole ratio of $SO_2=1.00$, it was found that the ratio of MgO sufficient to elevate pH was 1.16. It also was found that the ratio of S should be in excess of the $SO_2$ mole ratio. The ratio range which promoted successful reaction kinetics was found to be $S=1.17–1.20$.

The pH of the final MgTS solution can be correlated with the pH of the $Mg(HSO_3)_2$ intermediate and the pH of the reacting slurry throughout the MgTS reaction process. By adjusting the pH of the reacting slurry (e.g., with $SO_2$ or MgO), solution pH was gradually directed into the desired range, e.g., between 7 and 8. This adjustment process allowed a means of rectifying the variability of the reacting species in solution due to the slurry state of reaction, relative to pH.

Thus, a preferred mole ratio of MgO:S was found to be about 1.16:1.18. The $Mg(HSO_3)_2$ intermediate, which can be produced by adding $SO_2$ to MgO or MgO/S, can be used to adjust the slurry to a pH of about 6.3. Rapid purging of $SO_2$ generally produced $Mg(HSO_3)_2$ containing quantities of $SO_2$ less than stoichiometric ($SO_2$ molar ratio<1.00). $Mg(HSO_3)_2$ of pH=6.3, of deficient $SO_2$ molar ratio, assisted in pushing the pH of the reacting MgTS solution to a pH greater than 6.4.

For MgTS conversion, it was found a pH greater than 6.4 was lowered sparingly with $SO_2$, while a pH less than 6.05 was elevated with MgO. It is preferred to adjust pH with $SO_2$ because the response is immediate. When MgO is used, it generally is necessary to wait for the solid first to enter solution before it contributes to pH elevation.

Figure 4:
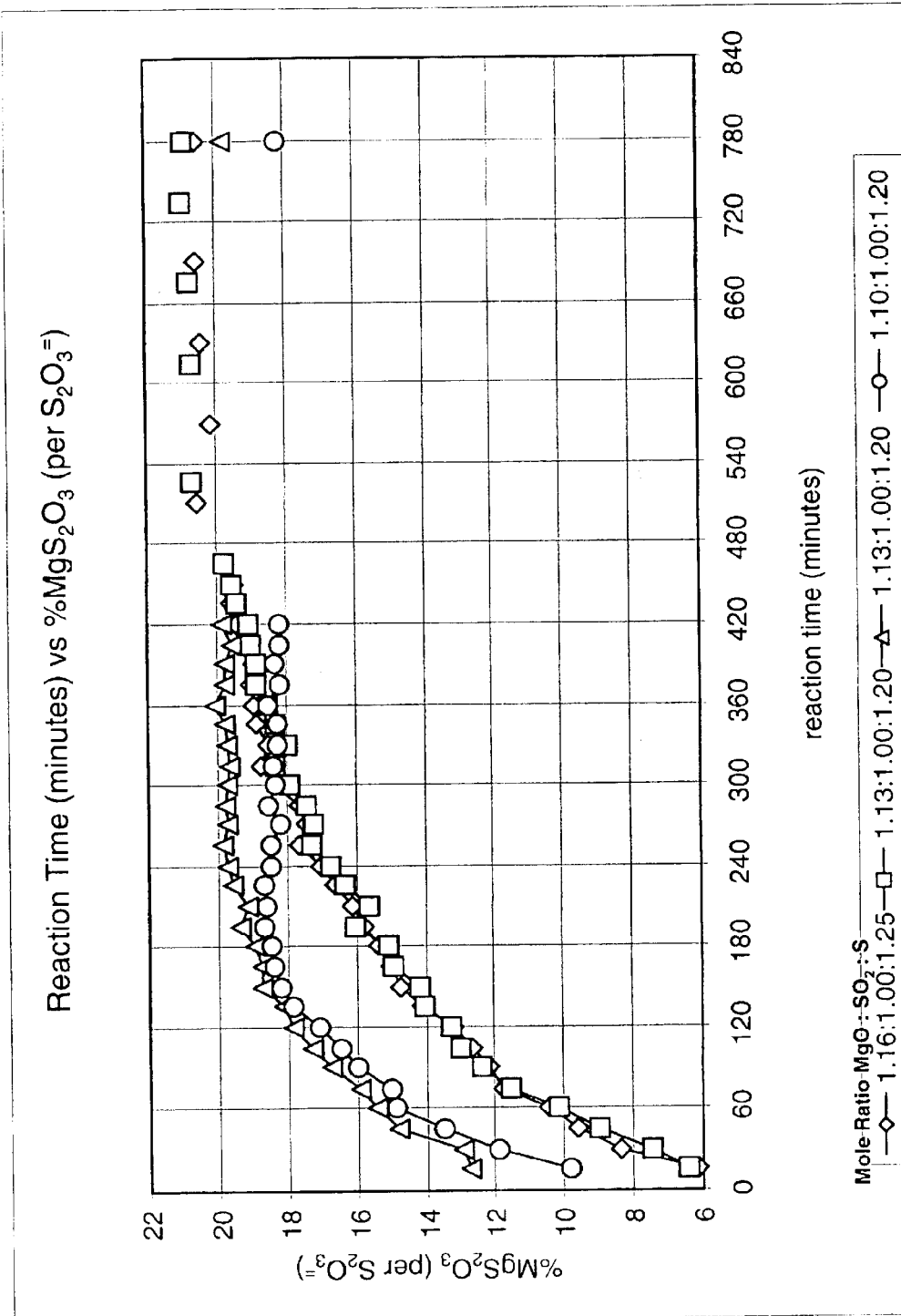
FIG. 4 is an illustration of time vs. percent magnesium thiosulfate.

The desired pH range of the final MgTS reaction slurry is 6.2 to 6.4 for this series of reactions. Another important factor is the reaction time. A graphical illustration of reaction kinetics is shown in FIG. 4.

Tests were conducted to investigate the effect of reaction time to over 480 minute periods. Generally, reaction times in the range of 240–480 minutes produced the highest yield. In addition, raw materials integrity, specifically the sensitivity of reaction kinetics to raw material, in this case the reactivity of the sulfur (the reactivity of the sulfur is related to its solid configuration and related surface area available for reaction) and the mole ratios $MgO:SO_2:S=1.13:1:1.2–1.16:1:1.2$ were found to influence reaction kinetics.

The two less soluble raw materials used in the $MgS_2O_3$ process, MgO and S, preferably are added in excess to improve reaction kinetics. The actual solid content of the reacting slurry is greatly reduced through the course of the $MgS_2O_3$ conversion process. However, unused excess raw materials and raw material impurities are retained, as solids, in the final product at the completion of Reaction (2). The remaining solids generally should be separated from the resulting product. Solid separation was more efficient if the product was first allowed to cool. MgO, in particular, becomes more insoluble as temperature drops. The captured solid was returned to reactor 1 for recycle in subsequent processes.

Once the $MgS_2O_3$ reaction process is complete, the product could be concentrated further to higher concentrations, e.g., up to 28–32%. The filtered solution is transferred to reactor 3. External heat is applied to the filtrate to effect evaporation of excess water. Evaporation can be realized at temperatures of 100–102° C. (212–216° F.). The temperature of evaporation is within the region of reaction temperature. Therefore, effective evaporation can ensue without compromise to product stability. The conclusion of the evaporation process was denoted as the instant when the predetermined weight of water, necessary to bring the dilute solution to the concentrated level, had been collected. The concentration process reduces the pH of the product solution by an average of 1 pH unit.

As illustrated in FIG. 5, further evaporation of liquid sample is possible for preparation of a solid magnesium thiosulfate product. Solid MgTS can be collected from the solutions, which can be allowed to evaporate at temperatures of approximately 38° C. (100° F.) in high surface area basins. The collected solids can be filtered with vacuum and oven dried under evacuated pressure.

A typical $MgS_2O_3$ product solution has a composition shown in Table 1 below:

TABLE 1

| Product Solution | |
| --- | --- |
| pH | 5.5–8.0 |
| specific gravity | 1.29–1.33 |
| % $MgS_2O_3$ (per $S_2O_3^{2-}$) | 28–30 |
| % $Mg^{2+}$ | 5.0–5.3 |
| % S | 13.2–14.1 |
| % $Mg(HSO_3)_2$ | <1.0 |
| % Alkalinity [as $Mg(OH)_2$] | <0.5 |
| % $MgSO_4$ | <0.5 |

A solution of $MgS_2O_3$ typically is colorless to pale yellow. The solution has a mild, inoffensive aroma. A typical solid has the composition shown in Table 2 below.

TABLE 2

| Solid Product | |
| --- | --- |
| Formula | $MgS_2O_3.3H_2O$ |
| % $Mg^{2+}$ | 12.8 |
| % S | 33.7 |
| % $Mg(HSO_3)_2$ | <3.0 |
| % Alkalinity [as Mg(OH)2] | <2.0 |

Figure 6:
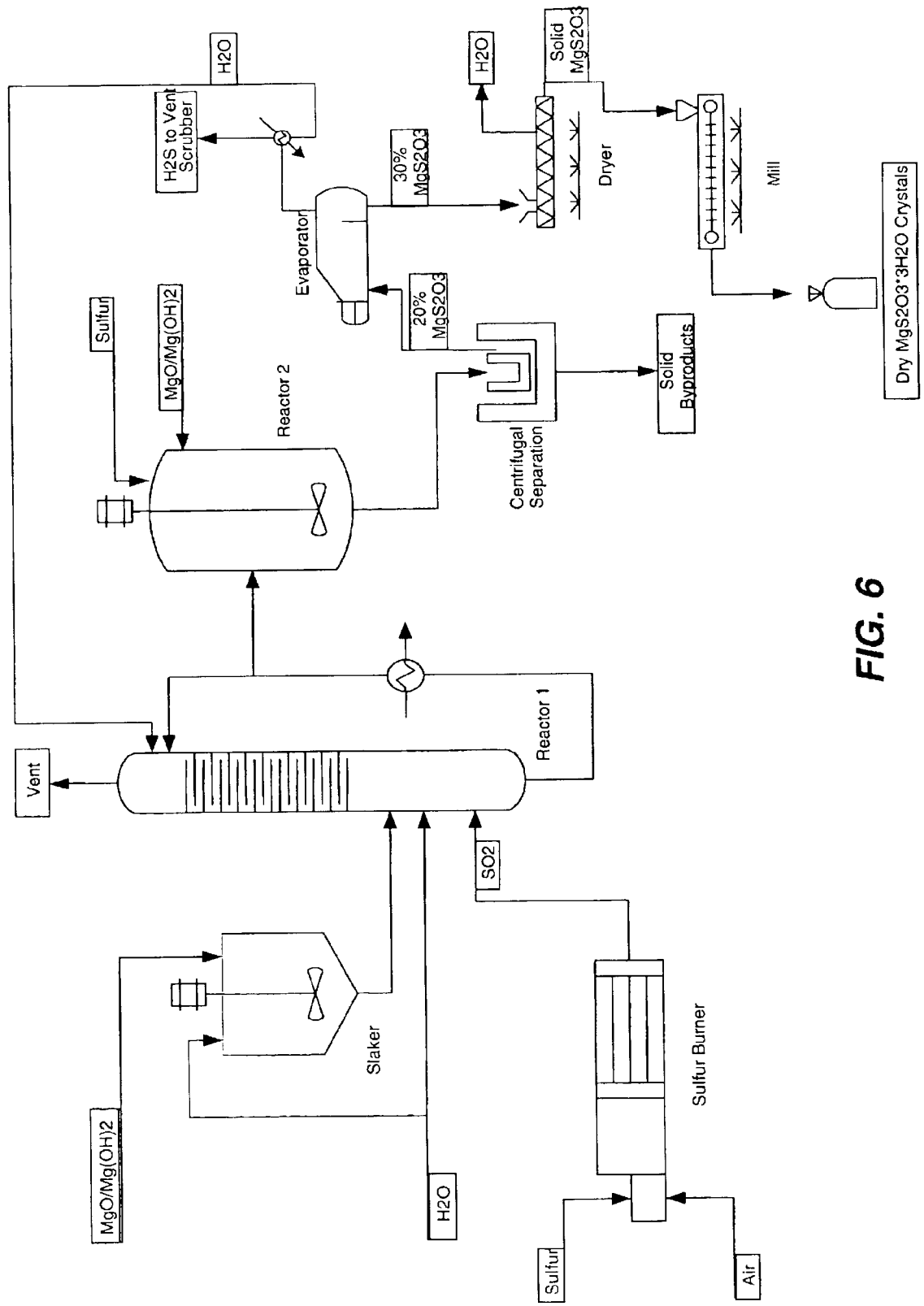
FIG. 6 is schematic illustration of controls steps for carrying out the process scheme shown in FIG. 5, according to one embodiment of the present invention.

FIG. 6 schematically illustrates process controls that may be used in carrying out the synthesis according to one embodiment of the present invention. Magnesium oxide and water can be charged into a slaker with efficient agitation applied, to generate magnesium hydroxide. Sulfur dioxide can be prepared by combining sulfur and air in a sulfur burner, and thereafter purged into reactor 1 to adjust the pH of the solution slurry, usually to about 2.5 to 6.5 and preferably to about 6.2–6.4. No external heat is necessary, as the purging is exothermic and generates heat. Gaseous by-products can be vented from reactor 1.

The magnesium hydrosulfite produced in reactor 1 is transferred to reactor 2. The prescribed quantity of sulfur is added. Heating preferably is applied to bring the temperature to about 97–100° C. (207–212° F.). Once within this range, the reaction may be continued with agitation until the conversion of hydrosulfite to thiosulfate is complete. The pH can be maintained between about 6.2–6.5 by adding MgO or $SO_2$.

The resulting reaction mixture is then subjected to centrifugal separation. Solids, such as sulfur and magnesium hydroxide, are separated and optionally are returned to reactor 1. The magnesium thiosulfate solution is delivered to an evaporator. Water evaporated therefrom may be returned to reactor 1. Hydrogen sulfide ($H_2S$) can be delivered to a scrubber, and water recycled to reactor 1.

The concentrated magnesium thiosulfate solution (~30%) optionally is treated in a dryer to obtain solid $MgS_2O_3$, which can be milled to form dry $MgS_2O_3 \cdot 3H_2O$ crystals.

EXAMPLES

The following examples are provided for illustrative purposes and should not be regarded as limiting the scope of the invention. The examples illustrate the preparation of $MgS_2O_3$ solution and solid products. The mole ratio of $MgO:SO_2:S$ used was 1.16:1:1.18; the stoichiometry of the reactions is illustrated below.

$$2.32 \text{ MgO} + 2.32 \text{ H}_2\text{O} \longrightarrow 2.32 \text{ Mg(OH)}_2 \quad (1)$$

$$2.32 \text{ Mg(OH)}_2 + 2.00 \text{ SO}_2 \rightarrow 1.00 \text{ Mg(HSO}_3)_2 + 1.32 \text{ Mg(OH)}_2 \quad (2)$$

$$1.00 \text{ Mg(HSO}_3)_2 + 1.32 \text{ Mg(OH)}_2 + 2.36 \text{ S} \rightarrow 2.00 \text{ MgS}_2\text{O}_3 + 2.00 \text{ H}_2\text{O} + 0.32 \text{ Mg(OH)}_2(1) + 0.36 \text{ S}(1) \quad (3)$$

Example 1

This example illustrates synthesizing the intermediate $Mg(HSO_3)_2$. Raw materials used were 20.8 g MgO (99% pure), 235.8 g $H_2O$ (DI), and 27.8 g $SO_2$. MgO was transferred into a 500 ml round bottom flask. The prescribed quantity of water was added. MgO was slaked for ~30 minutes by means of an overhead stirrer (rod and vertical blade). The temperature of the slaked slurry was 32° C. and pH 11.38. The product of slaking was of moderate thickness and milky white.

$SO_2$ was then purged, at a moderate rate of constantly flowing gas bubbles, into the $Mg(OH)_2$ slurry. $SO_2$ infusion was continued until pH was 6.30 (which took ~30 minutes or 0.9 g $SO_2$ per minute). The slurry temperature at completion was 73° C. The total $SO_2$ introduced was 27.8 g. The resultant $Mg(HSO_3)_2$ slurry was pale yellow and of heavier consistency than the precursor $Mg(OH)_2$ slurry. The solution portion of the slurry was analyzed and found to have the following properties: specific gravity ~1.1, $Mg^{2+}$=1.5%, $HSO_3^-$=11%. The actual mole ratio of $MgO:SO_2$ was 1.18:1.00.

Example 2

This example illustrates synthesizing $MgS_2O_3$ from the $Mg(HSO_3)_2$ intermediate prepared in Example 1. Sulfur (16.7g) was added to the warm (73° C.) $Mg(HSO_3)_2$ slurry. Heat was applied to the reactants via an underlying mantle until the mixture reached 97° C. The reaction was carried out for four hours within the temperature range of 97 to 100° C. The pH was maintained at a level of 6.3 by periodic adjustment; the pH was raised with MgO and was reduced with $SO_2$. The reaction progress is outlined in Table 3.

TABLE 3

Progression of MgTS Reaction

| Reaction Time (minutes) | pH | pH after adjustment (adjustment medium) | Temperature (° C.) |
|---|---|---|---|
| 0 | 6.90 | 6.60 ($SO_2$) | 97 |
| 30 | 6.62 | 6.30 ($SO_2$) | 98 |
| 60 | 6.90 | 6.30 ($SO_2$) | 98 |
| 90 | 6.81 | 6.30 ($SO_2$) | 98 |
| 120 | 6.71 | 6.30 ($SO_2$) | 98 |
| 150 | 6.63 | 6.63 | 98 |
| 180 | 6.56 | 6.40 ($SO_2$) | 98 |
| 210 | 6.32 | 6.32 | 98 |
| 230 | 6.35 | 6.30 ($SO_2$) | 98 |
| 240 | 6.21 | 6.21 | 98 |

After four hours, the applied heat was removed. The slurry was allowed to cool and settle. The pH of the settled slurry was 7.64 at 20° C. The slurry was filtered with vacuum through a 11.5 cm Whatman #2 filter paper contained in a Buchner funnel. Filtration occurred readily. The filtrate was transparent and pale yellow. It had a slightly sharp, but inoffensive aroma. 292.4 g of filtrate was recovered. Recovery as filtrate was 97.1% of original raw materials. The dried solids measured 3.6 g (1.2% of original raw materials). The filtrate had the properties shown in Table 4 below.

TABLE 4

Properties of MgTS Filtrate

| | |
|---|---|
| pH | 7.64 |
| specific gravity | 1.200 @ 23° C. |
| alkalinity [as $Mg(OH)_2$] | 0.03% |
| $Mg(HSO_3)_2$ | 0.11% |
| $MgS_2O_3$ (per $S_2O_3^{2-}$) | 20.47% |
| $Mg^{2+}$ | 3.77% |
| $Mg^{2+}$ recovery | 88.4% |
| S recovery | 91.9% |
| Final mole ratio of initial raw materials ($MgO:SO_2:S$) | 1.18:1.00:1.20 |

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

What is claimed is:

1. A process for preparing a magnesium thiosulfate solution comprising:

combining magnesium oxide and water to provide a magnesium hydroxide slurry or hydrated magnesium hydroxide;

adding sulfur dioxide to the magnesium hydroxide to form a mixture, and reacting the mixture to form a magnesium hydrosulfite slurry;

adding sulfur to the mixture, and reacting the mixture under conditions sufficient to form magnesium thiosulfate; and recovering the magnesium thiosulfate solution wherein the process proceeds according to the following reaction pathway:

$$MgO+2SO_2+H_2O \rightarrow Mg(HSO_3)_2$$

$$Mg(HSO_3)_2+2S+MgO \rightarrow 2MgS_2O_3+H_2O.$$

2. The process of claim 1 wherein the magnesium hydrosulfite slurry is heated to at least about 97° C.

3. The process of claim 2 wherein magnesium hydrosulfite slurry and sulfur are combined at a sulfur-to-sulfur dioxide ratio of from about 1:1 to 1.2:1 and the magnesium oxide quantity varies from 0 to a magnesium oxide-to-sulfur dioxide ratio of from about 0.5:1 to 0.6:1.

4. The process of claim 3 wherein the total magnesium oxide-to-sulfur dioxide ratio is from about 1:1 to 1.2:1.

5. The process of claim 1 wherein the hydrated magnesium hydroxide and sulfur dioxide are combined at a total MgO-to-SO$_2$ mole ratio of about 0.5:1 to 1.2:1.

6. The process of claim 5 wherein sulfur dioxide is added to the Mg(OH)$_2$ until a pH of about 2.5 to 6.5 is attained.

7. The process of claim 5 wherein the total magnesium oxide-to-sulfur dioxide ratio is from about 1:1 to 1.2:1.

8. The process of claim 1 wherein the step of adding sulfur dioxide to the magnesium hydroxide further comprises adjusting or maintaining the pH of the mixture at a pH of from about 2.5 to 6.5.

9. The process of claim 8 wherein no external heating in required for the exothermic reaction.

10. The process of claim 1 wherein a magnesium hydroxide slurry is provided.

11. The process of step 1 wherein hydrated magnesium hydroxide is provided.

12. A magnesium thiosulfate solution produced by the process of claim 1.

13. A process for preparing a magnesium thiosulfate solution comprising:

providing a magnesium hydroxide slurry or hydrated magnesium hydroxide;

adding sulfur dioxide to the magnesium hydroxide to form a mixture while maintaining the pH of the mixture at a pH of from about 2.5 to 6.5, wherein the total MgO to SO$_2$ mole ratio is from about 0.5:1 to 1.2:1;

reacting the mixture to form magnesium hydrosulfite, and heating the mixture to at least about 97° C.;

adding sulfur to the mixture at a sulfur-to-sulfur dioxide ratio of from about 1:1 to 1.2:1;

reacting the mixture under conditions sufficient to form magnesium thiosulfate; and recovering the magnesium thiosulfate solution.

14. A magnesium thiosulfate solution produced by the process of claim 13.

15. A magnesium thiosulfate solution comprising in an aqueous medium at least about 25 wt % MgS$_2$O$_3$, up to about 15 wt % sulfur, and up to about 6 wt % Mg$^{2+}$.

16. The magnesium thiosulfate solution of claim 15 which contains no more than about 2 wt % solid byproducts.

17. The magnesium thiosulfate solution of claim 15 wherein the concentration of MgS$_2$O$_3$ is at least about 30 wt %.

18. The magnesium thiosulfate solution of claim 15 which has the following properties:

| | |
|---|---|
| pH | 5.5–8.0 |
| specific gravity | 1.29–1.33 |
| % MgS$_2$O$_3$ (per S$_2$O$_3^{2-}$ | 28–30 |
| % Mg$^{2+}$ | 5.0–5.3 |
| % S | 13.2–14.1 |
| % Mg(HSO$_3$)$_2$ | <1.0 |
| % Alkalinity [as Mg(OH)$_2$] | <0.5 |
| % MgSO$_4$ | <0.5. |

* * * * *